(12) United States Patent
Li et al.

(10) Patent No.: US 12,339,489 B2
(45) Date of Patent: Jun. 24, 2025

(54) OPTICAL LENS AND OPTICAL DETECTION DEVICE

(71) Applicant: BOE Technology Group Co., Ltd., Beijing (CN)

(72) Inventors: Fan Li, Beijing (CN); Junrui Zhang, Beijing (CN); Quanguo Zhou, Beijing (CN); Jiuyang Cheng, Beijing (CN); Hao Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/271,950

(22) PCT Filed: Aug. 23, 2022

(86) PCT No.: PCT/CN2022/114102
§ 371 (c)(1),
(2) Date: Jul. 12, 2023

(87) PCT Pub. No.: WO2023/035928
PCT Pub. Date: Mar. 16, 2023

(65) Prior Publication Data
US 2024/0069274 A1 Feb. 29, 2024

(30) Foreign Application Priority Data
Sep. 13, 2021 (CN) .......................... 202111067757.9

(51) Int. Cl.
*G02B 6/08* (2006.01)
*G06T 7/00* (2017.01)

(52) U.S. Cl.
CPC .............. *G02B 6/08* (2013.01); *G06T 7/0002* (2013.01)

(58) Field of Classification Search
CPC ........ G02B 6/08; G02B 13/18; G02B 17/086; G02B 3/06; G06T 7/0002; G01N 21/01; G01N 21/8851; G01N 21/95
See application file for complete search history.

(56) References Cited

U.S. PATENT DOCUMENTS

| | | | |
|---|---|---|---|
| 9,372,355 B2 * | 6/2016 | Kim | H05B 33/10 |
| 2013/0234009 A1 | 9/2013 | Guldimann | |
| 2018/0321736 A1 | 11/2018 | Masson | |

FOREIGN PATENT DOCUMENTS

| | | |
|---|---|---|
| CN | 101153886 A | 4/2008 |
| CN | 106568779 A | 4/2017 |

(Continued)

OTHER PUBLICATIONS

KR 20160088529 A (machine translated copy) (Year: 2016).*

(Continued)

*Primary Examiner* — Seung C Sohn
(74) *Attorney, Agent, or Firm* — WHDA, LLP

(57) ABSTRACT

An optical lens includes: a first region, including a first incident surface and a first emergent surface that face each other, wherein the first incident surface is for, when a display panel is detected, receiving a first light ray from a plane region, and the first light ray exits from the first emergent surface after passing through the first region; a second region, connected to the first region, including a second incident surface and a second emergent surface that face each other, wherein the second incident surface is for, when the display panel is detected, receiving a second light ray that is from a curved-surface region and propagates in a first direction, and the second light ray exits from the second emergent surface in a second direction after passing through the second region; and the first emergent surface and the second emergent surface are located in a same plane.

20 Claims, 4 Drawing Sheets

(56) References Cited

FOREIGN PATENT DOCUMENTS

| | | |
|---|---|---|
| CN | 107664647 A | 2/2018 |
| CN | 108803028 A | 11/2018 |
| CN | 109949728 A | 6/2019 |
| CN | 111508400 A | 8/2020 |
| CN | 111650201 A | 9/2020 |
| CN | 211669102 U | 10/2020 |
| CN | 113777038 A | 12/2021 |
| KR | 101775458 B1 | 9/2017 |

OTHER PUBLICATIONS

Office Action dated Apr. 29, 2024, issued in counterpart CN Application No. 202111067757.9, with English translation. (13 pages).

\* cited by examiner

OPTICAL LENS AND OPTICAL DETECTION DEVICE

CROSS REFERENCE TO RELEVANT APPLICATIONS

The present disclosure claims the priority of the Chinese patent application filed on Sep. 13, 2021 before the China National Intellectual Property Administration with the application number of 202111067757.9 and the title of "OPTICAL LENS AND OPTICAL DETECTION DEVICE", which is incorporated herein in its entirety by reference.

TECHNICAL FIELD

The present disclosure relates to the technical field of optics, and particularly relates to an optical lens and an optical detecting device.

BACKGROUND

Display panels are the mainly component of displaying devices, and the quality of the display panels decides the quality of the displaying devices.

During the production of the display panels, the display panels easily have defects such as cracks, bubbles and stains, and after the display panels are fabricated, the display panels are required to be detected.

SUMMARY

The present disclosure provides an optical lens, and the optical lens is for regulating propagation directions of light rays from a display panel, the display panel includes at least a curved-surface region and a plane region connected to the curved-surface region, and the optical lens includes:
  a first region, including a first incident surface and a first emergent surface that face each other, where the first incident surface is for, when the display panel is detected, receiving a first light my from the plane region, and the first light ray exits from the first emergent surface after passing through the first region;
  a second region, connected to the first region, including a second incident surface and a second emergent surface that face each other, where the second incident surface is for, when the display panel is detected, receiving a second light ray that is from the curved-surface region and propagates in a first direction, and the second light ray exits from the second emergent surface in a second direction after passing through the second region; and
  the first emergent surface and the second emergent surface are located in a same plane.

In an alternative implementation, in a direction perpendicular to a boundary plane between the first region and the second region, the second region includes a plurality of waveguide layers that are arranged in stack, and the waveguide layers are for performing total reflection to the second light ray entering the waveguide layers, and the second light ray exits from the second emergent surface.

In an alternative implementation, each of the waveguide layers is provided with a coating layer on a surface close to the first region and/or a surface away from the first region, and a refractive index of the coating layer is greater than a refractive index of the waveguide layers.

In an alternative implementation, a material of the waveguide layers includes a borosilicate crown glass, and a material of the coating layer is silver.

In an alternative implementation, the plurality of waveguide layers delimit the second incident surface into a plurality of sub-surfaces, and areas of the sub-surfaces are equal.

In an alternative implementation, in the direction perpendicular to the boundary plane between the first region and the second region, a thickness of each of the waveguide layers is greater than or equal to 1.5 mm, and less than or equal to 100 mm.

In an alternative implementation, the first incident surface and the first emergent surface are parallel.

In an alternative implementation, in a direction of a boundary line between the first incident surface and the second incident surface, a shape of a cross-section of the second incident surface is a circular arc.

In an alternative implementation, the first incident surface and the circular arc are tangent.

In an alternative implementation, a central angle of the circular arc is greater than or equal to 10°, and less than or equal to 90°.

In an alternative implementation, a curvature radius of the circular arc is greater than or equal to 5 mm, and less than or equal to 1000 mm.

In an alternative implementation, the second region is provided on two opposite sides at a periphery of the first region.

The present disclosure provides an optical detecting device, where the optical detecting device includes a carrier platform, a light source, an image acquiring device, an image processing device and the optical lens according to any one of the above embodiments;
  the carrier platform is for carrying the display panel;
  the light source is for providing initial light rays entering the display panel, so that the display panel reflects the initial light rays to the optical lens;
  the optical lens is provided between the carrier platform and the image acquiring device;
  the image acquiring device is for acquiring light rays from the first emergent surface and the second emergent surface of the optical lens, and outputting image data; and
  the image processing device is for receiving the image data outputted by the image acquiring device, and determining defect data of the display panel.

In an alternative implementation, when the display panel is detected, an orthographic projection of the second region on the display panel covers the curved-surface region in a third direction, where the third direction refers to a direction perpendicular to a boundary line between the first incident surface and the second incident surface.

In an alternative implementation, when the display panel is detected, an orthographic projection of the first region on the display panel completely overlaps with the plane region in the third direction.

In an alternative implementation, in a direction of a boundary line between the first incident surface and the second incident surface, a cross-section of the second incident surface is a first circular arc, and when the display panel is detected a cross-section of the curved-surface region is a second circular arc, and the first circular arc and the second circular arc are concentric.

In an alternative implementation, a central angle of the first circular arc and a central angle of the second circular arc are equal.

In an alternative implementation, a ratio of a curvature radius of the first circular arc to a curvature radius of the second circular arc is greater than or equal to 1.5, and less than or equal to 5.

In an alternative implementation, the image acquiring device includes a CCD camera, the CCD camera is electrically connected to the image processing device, and a lens of the CCD camera is oriented towards the first emergent surface.

In an alternative implementation, the first direction is located outside an area of a field angle of the lens of the CCD camera, and the second direction is located inside the area of the field angle of the lens of the CCD camera.

In an alternative implementation, a quantity of the CCD camera is one.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
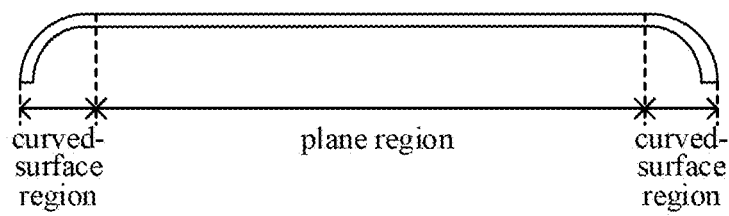
FIG. 1 schematically shows a schematic sectional structural diagram of a display panel.
Figure 2:
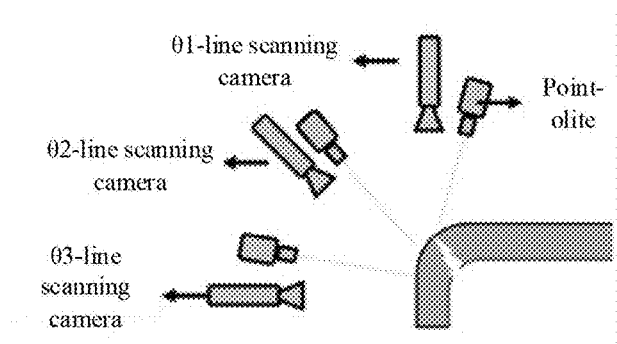
FIG. 2 schematically shows a schematic structural diagram of a detecting device in the related art.

Display panels might have imperfects such as cracks, bubbles and stains during the production, which, if not detected in time, subsequently results in waste of the processes and the materials. The method for detecting the display panels usually includes obtaining an overall appearance image of the display panel by using a camera, and subsequently performing imperfect identification on the appearance image by using related software. The inventor has found that, regarding the nonplanar display panel shown in FIG. 1, if the photographing uses a single camera, because of the existence of the curved-surface region, a clear appearance image cannot be obtained. In order to obtain a clear appearance image, a plurality of cameras may be used, for example, the θ1-line scanning camera, the θ2-line scanning camera and the θ3-line scanning camera in FIG. 2, to photograph the positions of different curvatures of the curved-surface region, subsequently the images photographed by the plurality of cameras are spliced, and subsequently the spliced image undergoes imperfect detection. Such a detection mode requires splicing the plurality of images, and requires providing the plurality of cameras, which increases the complexity of the detecting device.

Figure 4:
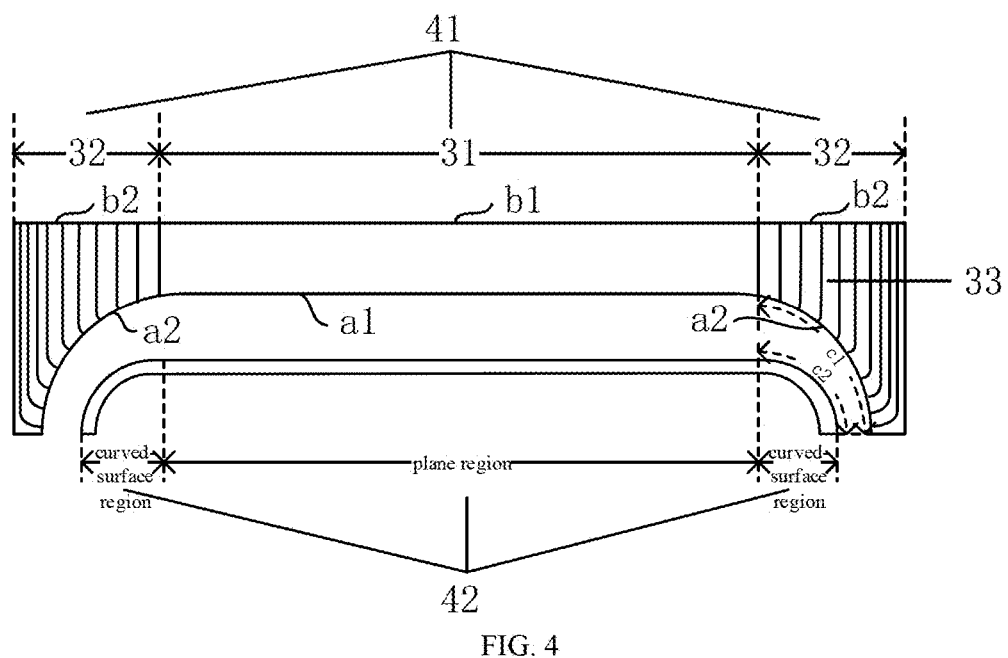
FIG. 4 schematically shows a schematic sectional structural diagram of an optical lens and a display panel.

In order to solve the above problem, an embodiment of the present disclosure provides an optical lens, and the optical lens is for regulating the propagation directions of light rays from a display panel. Referring to FIG. 4, FIG. 4 schematically shows a schematic sectional structural diagram of an optical lens 41 and a display panel 42. As shown in FIG. 4, the display panel 42 includes at least a curved-surface region and a plane region connected to the curved-surface region.

Figure 3:
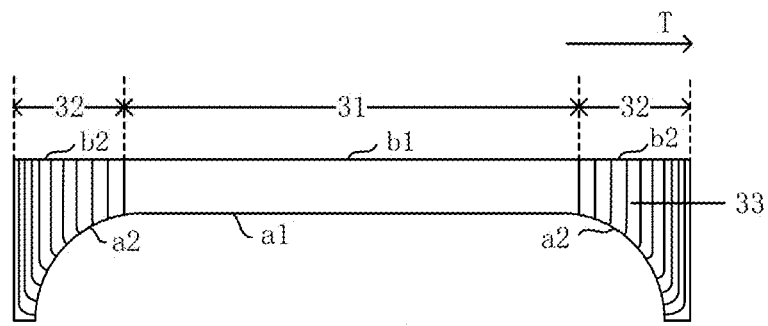
FIG. 3 schematically shows a schematic sectional structural diagram of an optical lens according to the present disclosure.

Referring to FIG. 3, FIG. 3 schematically shows a schematic sectional structural diagram of an optical lens according to the present disclosure. As shown in FIGS. 3 and 4, the optical lens includes:

a first region 31, including a first incident surface a1 and a first emergent surface b1 that face each other, where the first incident surface a1 is for, when the display panel 42 is detected, receiving a first light ray from the plane region, and the first light ray exits from the first emergent surface b1 after passing through the first region 31; and a second region 32, connected to the first region 31, including a second incident surface a2 and a second emergent surface b2 that face each other, where the second incident surface a2 is for, when the display panel 42 is detected, receiving a second light ray that is from the curved-surface region and propagates in a first direction, and the second light ray exits from the second emergent surface b2 in a second direction after passing through the second region 32.

Figure 8:
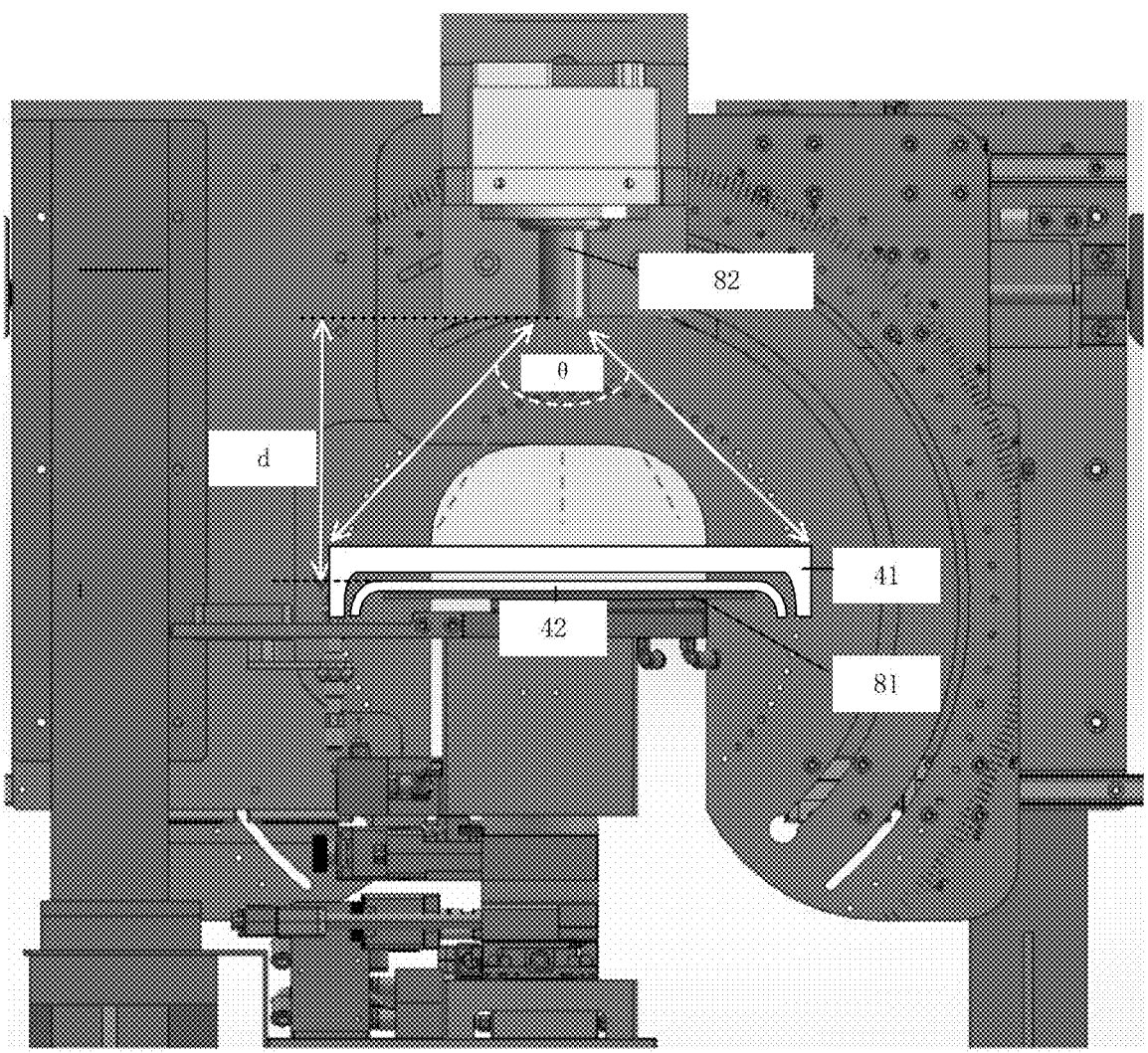
FIG. 8 schematically shows a side schematic structural diagram of an optical detecting device according to the present disclosure.

In a particular implementation, when the display panel 42 is detected, as shown in FIG. 8, the optical lens 41 may be provided between the display panel 42 and an image acquiring device 82, the optical lens 41 is for regulating the propagation directions of the light rays from the display panel 42, and the light rays exiting the first emergent surface b1 and the second emergent surface b2 of the optical lens 41 may be acquired by the image acquiring device 82.

The first incident surface a1 of the optical lens 41 receives the first light ray from the plane region of the display panel 42, and the first light ray passes through the first region 31 and subsequently exits from the first emergent surface b1.

The second incident surface a2 of the optical lens 41 receives the second light ray from the curved-surface region of the display panel 42, and regulates the propagation direction of the second light ray from the fast direction to the second direction, and subsequently the second light ray exits from the second emergent surface b2. The second region 32 of the optical lens 41 receives the diverging light rays from the curved-surface region, and regulates the propagation directions of those light rays, which may regulate the propagation directions of the light rays that cannot be collected by the image acquiring device 82 into the direction that can be collected by the image acquiring device 82, thereby increasing the amount of the collection of the light rays from the curved-surface region.

In the present embodiment, the first emergent surface b1 and the second emergent surface b2 are located in the same plane.

In the related art, when the display panel 42 is detected, because no optical lens 41 is provided, the collecting surface of the image acquiring device 82 is the surface of the display panel 42 that is close to the image acquiring device 82; in other words, the collecting surface is nonplanar.

In the present embodiment, the optical lens 41 may, when the display panel 42 is detected, be provided between the display panel 42 and the image acquiring device 82. Accordingly, the collecting surface of the image acquiring device 82 is the first emergent surface b1 and the second emergent surface b2. Because the first emergent surface b1 and the second emergent surface b2 are located in the same plane, by providing the optical lens 41, the conversion of the collecting surface from a nonplanar surface to a flat surface may be realized.

Because the first emergent surface b1 and the second emergent surface b2 are located in the same plane, the image acquiring device 82 may collect the light rays exiting from the first emergent surface b1 and the second emergent surface b2, to realize the conversion of the collecting surface from the nonplanar surface to the flat surface. Even if the image acquiring device 82 is a single camera, clear images of the plane region and the curved-surface region may be obtained, thereby increasing the accuracy rate of imperfect detection.

In an alternative implementation, in the direction perpendicular to the boundary plane between the first region 31 and the second region 32, for example, the direction pointed by the arrow T in FIG. 3, the second region 32 may include a plurality of waveguide layers 33 that are arranged in stack, and the waveguide layers 33 are for performing total reflection to the second light ray entering the waveguide layers, and subsequently the second light ray exits from the second emergent surface b2.

In the present implementation, regarding each of the waveguide layers 33, the second light ray entering the waveguide layer 33 has total reflection between the surface of the waveguide layer 33 that is close to the first region 31 and the surface of the waveguide layer 33 that is away from the first region 31, and subsequently exits from the second emergent surface b2.

Regarding each of the waveguide layers 33, the transmittance may be the ratio of the intensity of the light ray passing through the waveguide layer 33 and exiting from the second emergent surface b2 to the intensity of the total light ray entering the waveguide layer 33. In order to increase the transmittances of the waveguide layers 33, in an alternative implementation, each of the waveguide layers 33 is provided with a coating layer on the surface close to the first region 31 and/or the surface away from the first region 31, and the refractive index of the coating layer is greater than the refractive index of the waveguide layers 33.

In the present implementation, the coating layer may be provided on the surface of each of the waveguide layers 33 that is close to the first region 31, or the coating layer may be provided on the surface of each of the waveguide layers 33 that is away from the first region 31, or the coating layer may be provided on both of the surface of each of the waveguide layers 33 that is close to the first region 31 and the surface that is away from the first region 31. By providing the coating layers, the reflectivity of the light rays inside the waveguide layers 33 may be increased, and the refraction is reduced.

The material of the waveguide layers 33 may, for example, include a borosilicate crown glass and so on, and the material of the coating layer may, for example, be a metal material such as silver. The borosilicate crown glass is the BK7 glass, and has a refractive index of 1.15872, an absorptivity of 0.0002001, and a penetration rate of 0.998001. The refractive index of silver is 1.67. In a particular implementation, it is merely required that the refractive index of the waveguide layers 33 is less than the refractive index of the coating layers, and the material of the waveguide layers 33 and the material of the coating layers are not limited in the present embodiment.

Optionally, the plurality of waveguide layers 33 delimit the second incident surface a2 into a plurality of sub-surfaces, and the areas of the sub-surfaces are equal. The quantity of the sub-surfaces is equal to the quantity of the waveguide layers 33. Particularly, the second incident surface a2 is delimited by the plurality of waveguide layers 33 evenly into the plurality of sub-surfaces. The areas of the sub-surfaces may be equal, and the shapes of the sub-surfaces may be the same. The parts of the different waveguide layers 33 that are located on the second incident surface a2 correspond to different sub-surfaces; in other words, the surfaces of the sides of the different waveguide layers 33 that are close to the display panel correspond to different sub-surfaces.

For example, the quantity of the waveguide layers 33 may be 10, and accordingly the waveguide layers 33 delimit the second incident surface a2 into ten equal parts, i.e., 10 sub surfaces.

In the direction perpendicular to the boundary plane between the first region 31 and the second region 32, for example, the direction pointed by the arrow T in FIG. 3, the thickness of each of the waveguide layers 33 may be greater than or equal to 1.5 mm, and less than or equal to 100 mm. When the thickness of each of the waveguide layers 33 is within that range, not only the demand on regulating the propagation direction of the second light my can be satisfied, but also it may ensure that the difficulty in fabricating the waveguide layers 33 is within a controllable range, to reduce the cost.

In a particular implementation, the quantity of the waveguide layers 33 and the thickness of each of the waveguide layers 33 may be configured according to practical situations, and are not limited in the present embodiment.

In the present implementation, by providing the plurality of waveguide layers 33 within the second region 32, the waveguide layers 33 perform total reflection to the second light ray entering them, to realize the adjustment on the propagation direction of the second light ray, to realize converting the light rays from the curved-surface region, i.e., the nonplanar surface, into light rays exiting from the second emergent surface b2 i.e., the flat surface.

Figure 6:
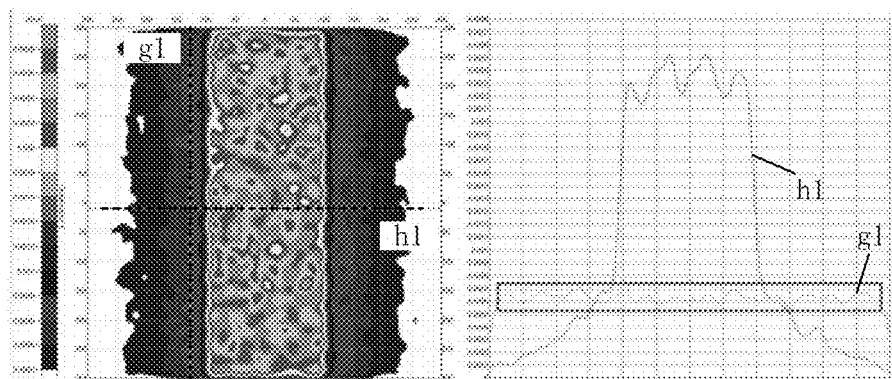
FIG. 6 schematically shows a schematic diagram of the image of a display panel and the distribution of the luminous flux when no optical lens is provided.
Figure 7:
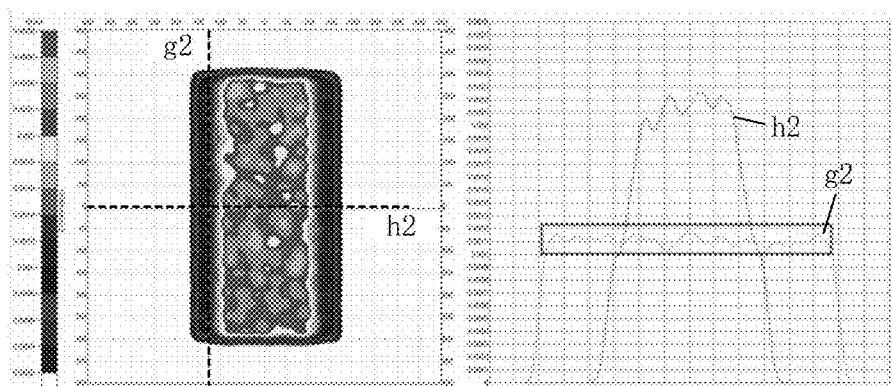
FIG. 7 schematically shows a schematic diagram of the image of a display panel and the distribution of the luminous flux when an optical lens is provided.

The inventor has simulated, by using simulating software, two solutions in which the optical lens 41 is not provided and the optical lens 41 is provided where both of the two solutions use a single camera to acquire the image of the display panel 42. Referring to FIG. 6, the left figure in FIG. 6 schematically shows the image of the display panel not provided with the optical lens, and the right figure illustrates the distribution of the luminous flux in the image of the display panel along the two lines g1 and h1. Referring to FIG. 7, the left figure in FIG. 7 schematically shows the image of the display panel provided with the optical lens, and the right figure illustrates the distribution of the luminous flux in the image of the display panel along the two lines g2 and h2.

As shown in FIG. 6, in the image of the display panel obtained in the solution using the single camera and no optical lens 41, the edge light rays are divergent, the luminous flux within the curved-surface region sharply decreases, and the luminous flux at the boundary of the curved-surface region is merely 0.0006 W/m$^2$-0.0007 W/m$^2$. As shown in FIG. 7, in the image of the display panel obtained in the solution using the single camera and added the optical lens 41, when the other parameters are the same, the luminous flux at the boundary of the curved-surface region is increased to approximately 0.0011 W/m$^2$, and the dispersion of the edge light rays of the image is obviously reduced. That can effectively control the loss of the light rays within the curved-surface region, and the camera can collect more light rays from the curved-surface region, thereby increasing the brightness of the image of the curved-surface region, to realize accurate detection on the imperfects within the curved-surface region.

In an alternative implementation, as shown in FIG. 3, the first incident surface a1 and the first emergent surface b1 may be parallel. Particularly, when the display panel 42 is detected, both of the first incident surface a1 and the first emergent surface b1 may be parallel to the display panel 42, as shown in FIG. 4. In a particular implementation, the first region 31 may be a flat glass of an integral structure, and the material of the flat glass may, for example, be a borosilicate crown glass.

In the present implementation, the propagation direction of the first light ray before entering the first region 31 and the propagation direction after exiting from the first region 31 are the same.

It should be noted that the first region 31 may be of any structure that can transmit the first light ray. For example, the first region 31 may also be a component such as a convex lens, which is not limited in the present embodiment. The propagation directions of the first light ray before entering the first region 31 and after exiting from the first region 31 may be the same or different, which is not limited in the present embodiment.

In an alternative implementation, as shown in FIG. 3, in the direction of the boundary line between the first incident surface a1 and the second incident surface a2, the shape of the cross-section of the second incident surface a2 is a circular arc.

In a particular implementation, as shown in FIG. 3, the first incident surface a1 and the second incident surface a2 may be tangent. In the present implementation, the first incident surface a1 and the circular arc are tangent.

The central angle of the circular arc may be greater than or equal to 10°, and less than or equal to 90°. For example, the central angle of the circular arc may be 30°, 45°. 60° and so on. In a particular implementation, the central angle of the circular arc may be set according to the structure of the curved-surface region of the tested display panel 42, and is not limited in the present embodiment.

The curvature radius of the circular arc may be greater than or equal to 5 mm, and less than or equal to 1000 mm. For example, the curvature radius of the circular arc may be 6 mm, 10 mm, 100 mm, 500 mm and so on. In a particular implementation, the curvature radius of the circular arc may be set according to the structure of the curved-surface region of the tested display panel 42, and is not limited in the present embodiment.

It should be noted that the position relation between the second region 32 and the first region 31 may be configured according to the practical structure of the display panel. The second region 32 may correspond to the position of the curved-surface region, to ensure that, when the display panel is being detected, the second region 32 can receive the light rays from the curved-surface region. For example, if the curved-surface region of the display panel is located at the periphery of the plane region, the second region 32 may be provided correspondingly at the periphery of the first region 31.

In an alternative implementation, as shown in FIG. 4, if the curved-surface region is provided on two opposite sides at the periphery of the plane region, then the second region 32 may be provided on both of the two opposite sides at the periphery of the first region 31. Optionally, the second region 32 may be provided symmetrically on the two sides of the fast region 31.

Optionally, if the curved-surface region surrounds the periphery of the plane region, then the second region 32 may surround the periphery of the first region 31. That can ensure that the second light my from the curved-surface region enters the second region 32 to the largest extent, thereby increasing the amount of the collection of the light rays from the curved-surface region.

Another embodiment of the present disclosure provides an optical detecting device. Referring to FIG. 8. FIG. 8 schematically shows a side schematic structural diagram of an optical detecting device according to the present disclosure. As shown in FIG. 8, the optical detecting device includes a carrier platform 81, a light source, an image acquiring device 82, an image processing device and the optical lens 41 according to any one of the above embodiments.

The carrier platform 81 is for carrying the display panel 42. The display panel 42 is provided on the side of the carrier platform 81 that is close to the image acquiring device 82.

The light source is for providing initial light rays entering the display panel 42, whereby the display panel 42 reflects the initial light rays to the optical lens 41.

The optical lens 41 is provided between the carrier platform 81 and the image acquiring device 82. The relative position relation between the display panel 42 provided on the carrier platform 81 and the optical lens 41 may be shown in FIGS. 4 and 5. The display panel 42 and the optical lens 41 are separate, and the distance therebetween may be adjusted according to practical demands.

The image acquiring device 82 is for acquiring light rays from the first emergent surface b1 and the second emergent surface b2 of the optical lens 41, and outputting image data.

The image processing device is for receiving the image data outputted by the image acquiring device 82, and determining defect data of the display panel 42.

In the present embodiment, because the optical lens 41 is provided between the carrier platform 81 and the image acquiring device 82, the light-ray collecting surface of the image acquiring device 82 is the first emergent surface b1 and the second emergent surface b2, and because the first emergent surface b1 and the second emergent surface b2 are located in the same plane, the light-ray collecting surface of the image acquiring device 82 is a flat face. Therefore, even if the image acquiring device 82 has merely a single camera, a clear image of the display panel can be obtained, thereby increasing the accuracy rate of imperfect detection.

When the image acquiring device is of a single-camera structure, as compared with a multi-camera structure, not only the complexity of the structure of the detecting device can be reduced, but also it can be avoided to splice the images collected by the plurality of cameras, thereby reducing the complexity of the algorithm processing, and increasing the speed of the algorithm processing.

Because of the provision of the optical lens 41, the image acquiring device 82 can collect more light rays from the curved-surface region, thereby increasing the brightness of the image of the curved-surface region, which facilitates to detect subtle imperfects, to increase the precision and the accuracy of the detection.

In the present embodiment, when the display panel 42 is being detected, the orthographic projection of the second region 32 on the display panel 42 and the curved-surface region intersect or overlap, which can ensure that the second light ray from the curved-surface region can enter the second region 32.

In an alternative implementation, as shown in FIG. 4, when the display panel 42 is being detected, the orthographic projection of the second region 32 on the display panel 42 covers the curved-surface region in a third direction. That can ensure that the second light ray enters the second region 32 to the largest extent, thereby increasing the amount of the collection of the light rays from the curved-surface region. The third direction refers to the direction perpendicular to the boundary line between the first incident surface a1 and the second incident surface a2.

In the present embodiment, when the display panel 42 is being detected, the orthographic projection of the first region 31 on the display panel 42 and the plane region intersect or overlap, to ensure that the first light ray from the plane region can enter the first region 31.

In an alternative implementation, as shown in FIG. 4, when the display panel 42 is being detected, the orthographic projection of the first region 31 on the display panel 42 may completely overlap with the plane region in the third direction. That can ensure that the first light ray enters the first region 31 to the largest extent, and prevents the second light ray from the curved-surface region from entering the first region 31.

Figure 5:
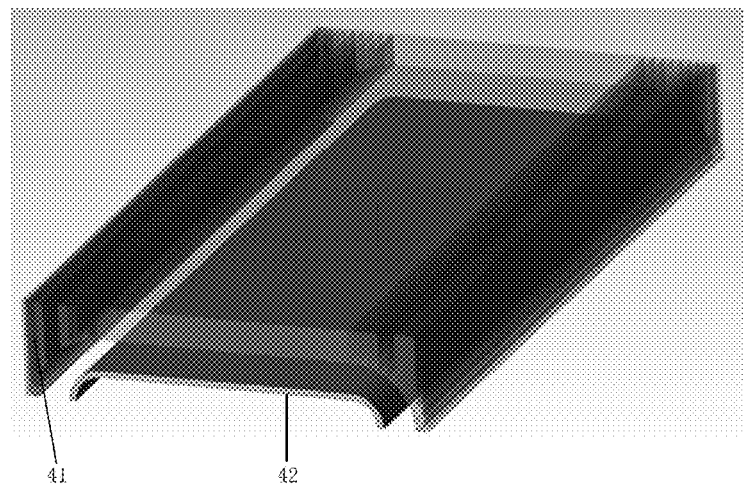
FIG. 5 schematically shows a schematic perspective structural diagram of an optical lens and a display panel.

Referring to FIG. 5, FIG. 5 schematically shows a schematic perspective structural diagram of the optical lens 41 and the display panel 42. In FIG. 5, the orthographic projection of the first region 31 on the display panel 42 completely overlaps with the plane region, and the orthographic projection of the second region 32 on the display panel 42 completely overlaps with the curved-surface region. Accordingly, the image of the whole display panel can be obtained by using a single camera to perform one time of photographing, it is not required to move the camera and the optical lens in the direction of the boundary line between the first incident surface a1 and the second incident surface a2, and no image splicing is required, which can further increase the detection efficiency.

In an alternative implementation, as shown in FIG. 4, in the direction of the boundary line between the first incident surface a1 and the second incident surface a2, the cross-section of the second incident surface a2 is a first circular arc c1, and when the display panel 42 is being detected, the cross-section of the curved-surface region is a second circular arc c2, and the first circular arc c1 and the second circular arc c2 are concentric.

The second circular arc c2 is the cross-section of the surface of the curved-surface region that is close to the optical lens along the boundary line between the first incident surface a1 and the second incident surface a2.

The central angles of the first circular arc c1 and the second circular arc c2 may be equal or unequal, which is not limited in the present embodiment.

If the first circular arc c1 and the second circular arc c2 are concentric, and the central angles of the first circular arc c1 and the second circular arc c2 are equal, the distance between the display panel 42 and the optical lens 41 is adjusted, and when the end of the curved-surface region of the display panel 42 that is close to the carrier platform 81 and the end of the second region 32 of the optical lens 41 that is close to the carrier platform 81 flush, it can be ensured that the orthographic projection of the second region 32 on the display panel 42 completely covers the curved-surface region in the third direction. As shown in FIG. 4, the orthographic projection of the second region 32 on the display panel 42 completely overlaps with the curved-surface region in the third direction.

The ratio of the curvature radius of the first circular arc c1 to the curvature radius of the second circular arc c2 may be greater than or equal to 1.5, and less than or equal to 5. For example, the curvature radius of the first circular arc c1 may be 2 times the curvature radius of the second circular arc c2.

In the present embodiment, the image acquiring device 82 may include a single high-definition industrial wide-angle camera. In an alternative implementation, the image acquiring device 82 includes a CCD camera, and the CCD camera is electrically connected to the image processing device. In order to reduce the complexity of the detecting device, the quantity of the CCD camera may, for example, be one.

As shown in FIG. 8, the lens of the CCD camera may face the first emergent surface b1.

As shown in FIG. 8, when the display panel 42 is being detected, the minimum distance d between the lens of the CCD camera and the display panel 42 may be greater than or equal to 500 mm, and less than or equal to 1000 mm.

In a particular implementation, the first direction may be located outside the area of the field angle θ of the lens of the CCD camera, and the second direction is located inside the area of the field angle θ of the lens of the CCD camera. That can ensure that the image acquiring device 82 can collect more light rays from the curved-surface region, thereby increasing the brightness of the image of the curved-surface region.

As shown in FIG. 8, the field angle θ of the lens of the CCD camera may be greater than or equal to 90°, and less than or equal to 100.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The optical lens and the optical detecting device according to the present disclosure have been described in detail above. The principle and the embodiments of the present disclosure are described herein with reference to the particular examples, and the description of the above embodiments is merely intended to facilitate to comprehend the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptative alternations of the present disclosure, where those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An optical lens, wherein the optical lens is for regulating propagation directions of light rays from a display panel, the display panel comprises at least a curved-surface region and a plane region connected to the curved-surface region, and the optical lens comprises:
a first region, comprising a first incident surface and a first emergent surface that face each other, wherein the first incident surface is for, when the display panel is detected, receiving a first light ray from the plane region, and the first light ray exits from the first emergent surface after passing through the first region;
a second region, connected to the first region, comprising a second incident surface and a second emergent surface that face each other, wherein the second incident surface is for, when the display panel is detected, receiving a second light ray that is from the curved-surface region and propagates in a first direction, and the second light ray exits from the second emergent surface in a second direction after passing through the second region; and
the first emergent surface and the second emergent surface are located in a same plane.

2. The optical lens according to claim 1, wherein in a direction perpendicular to a boundary plane between the first region and the second region, the second region comprises a plurality of waveguide layers that are arranged in stack, and the waveguide layers are for performing total reflection to the second light ray entering the waveguide layers, and the second light ray exits from the second emergent surface.

3. The optical lens according to claim 2, wherein each of the waveguide layers is provided with a coating layer on a surface close to the first region and/or a surface away from the first region, and a refractive index of the coating layer is greater than a refractive index of the waveguide layers.

4. The optical lens according to claim 3, wherein a material of the waveguide layers comprises a borosilicate crown glass, and a material of the coating layer is silver.

5. The optical lens according to claim 2, wherein the plurality of waveguide layers delimit the second incident surface into a plurality of sub-surfaces, and areas of the sub-surfaces are equal.

6. The optical lens according to claim 2, wherein in the direction perpendicular to the boundary plane between the first region and the second region, a thickness of each of the waveguide layers is greater than or equal to 1.5 mm, and less than or equal to 100 mm.

7. The optical lens according to claim 1, wherein the first incident surface and the first emergent surface are parallel.

8. The optical lens according to claim 1, wherein in a direction of a boundary line between the first incident surface and the second incident surface, a shape of a cross-section of the second incident surface is a circular arc.

9. The optical lens according to claim 8, wherein the first incident surface and the circular arc are tangent.

10. The optical lens according to claim 8, wherein a central angle of the circular arc is greater than or equal to 10°, and less than or equal to 90°.

11. The optical lens according to claim 8, wherein a curvature radius of the circular arc is greater than or equal to 5 mm, and less than or equal to 1000 mm.

12. The optical lens according to claim 1, wherein the second region is provided on two opposite sides at a periphery of the first region.

13. An optical detecting device, wherein the optical detecting device comprises a carrier platform, a light source, an image acquiring device, an image processing device and the optical lens according to claim 1;
the carrier platform is for carrying the display panel;
the light source is for providing initial light rays entering the display panel, so that the display panel reflects the initial light rays to the optical lens;
the optical lens is provided between the carrier platform and the image acquiring device;
the image acquiring device is for acquiring light rays from the first emergent surface and the second emergent surface of the optical lens, and outputting image data; and
the image processing device is for receiving the image data outputted by the image acquiring device, and determining defect data of the display panel.

14. The optical detecting device according to claim 13, wherein when the display panel is detected, an orthographic projection of the second region on the display panel covers the curved-surface region in a third direction, wherein the third direction refers to a direction perpendicular to a boundary line between the first incident surface and the second incident surface.

15. The optical detecting device according to claim 14, wherein when the display panel is detected, an orthographic projection of the first region on the display panel completely overlaps with the plane region in the third direction.

16. The optical detecting device according to claim 13, wherein in a direction of a boundary line between the first incident surface and the second incident surface, a cross-section of the second incident surface is a first circular arc, and when the display panel is detected, a cross-section of the curved-surface region is a second circular arc, and the first circular arc and the second circular arc are concentric.

17. The optical detecting device according to claim 16, wherein a central angle of the first circular arc and a central angle of the second circular arc are equal.

18. The optical detecting device according to claim 16, wherein a ratio of a curvature radius of the first circular arc to a curvature radius of the second circular arc is greater than or equal to 1.5, and less than or equal to 5.

19. The optical detecting device according to claim 13, wherein the image acquiring device comprises a CCD camera, the CCD camera is electrically connected to the image processing device, and a lens of the CCD camera is oriented towards the first emergent surface.

20. The optical detecting device according to claim 19, wherein the first direction is located outside an area of a field angle of the lens of the CCD camera, and the second direction is located inside the area of the field angle of the lens of the CCD camera.

* * * * *